(No Model.)
G. WESTINGHOUSE, Jr.
ELECTRIC CONVERTER.
No. 436,200. Patented Sept. 9, 1890.
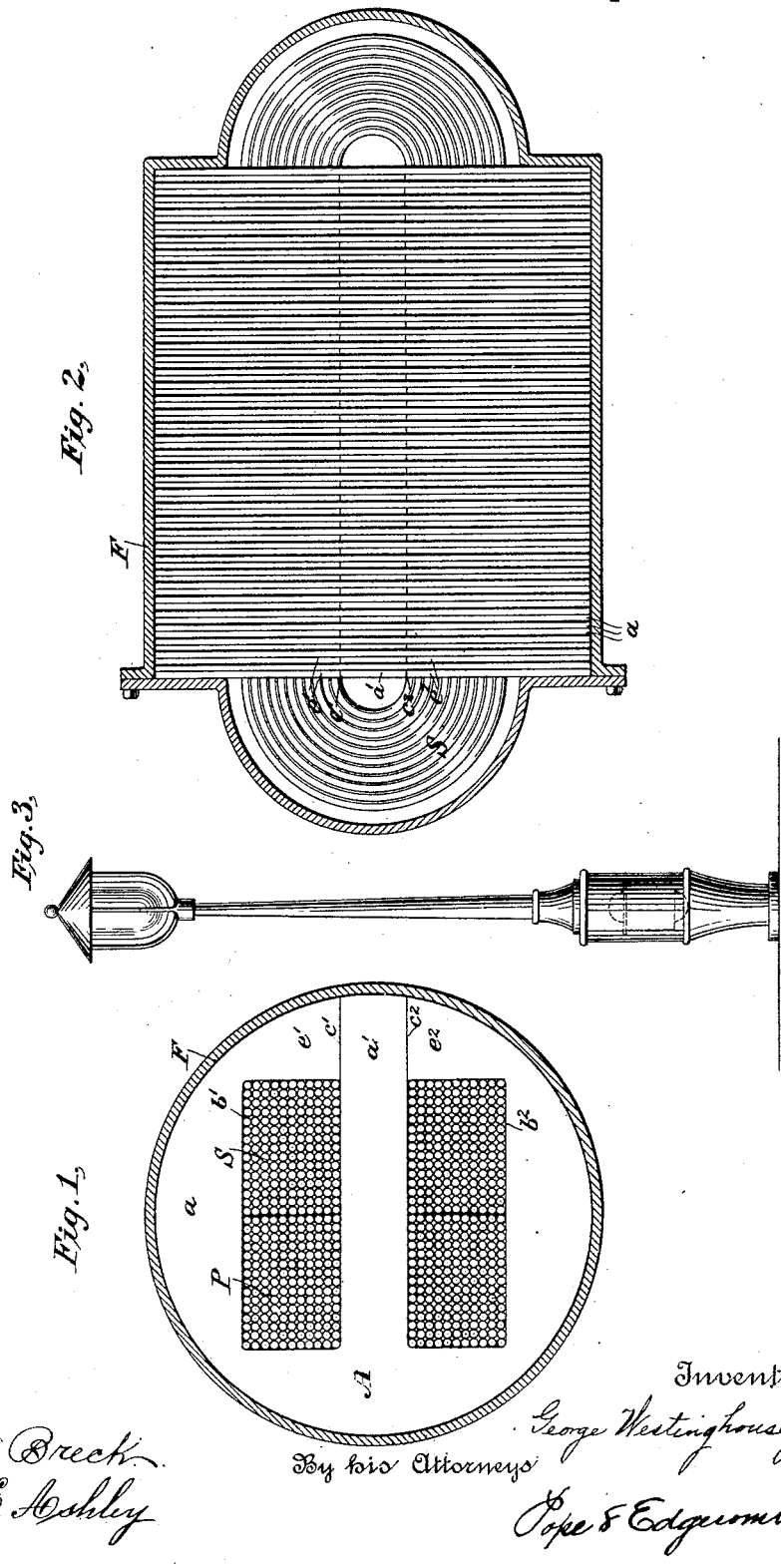

UNITED STATES PATENT OFFICE.

GEORGE WESTINGHOUSE, JR., OF PITTSBURG, PENNSYLVANIA.

ELECTRIC CONVERTER.

SPECIFICATION forming part of Letters Patent No. 436,200, dated September 9, 1890.

Application filed January 11, 1887. Serial No. 224,018. (No model.)

*To all whom it may concern:*

Be it known that I, GEORGE WESTINGHOUSE, Jr., a citizen of the United States, residing in Pittsburg, in the county of Allegheny and State of Pennsylvania, have invented certain new and useful Improvements in Electric Converters, of which the following is a specification.

The invention relates to the class of apparatus employed for transforming electric currents of any given potential into currents of a different potential. Such devices are usually termed "induction-coils" or "electric converters."

The object of the present invention is to provide an electric converter which may be conveniently employed in transforming the alternating currents of high potential conveyed along the streets of a city or town by primary conductors into secondary or induced currents at such points as may be found desirable.

To this end the invention consists generally in constructing the converters in the form of cylinders of such size as to be conveniently placed inside the lamp-posts placed along the line of primary conductors. The cores of the converters are preferably built up of thin sheets or plates of soft iron circular in form, which are stamped with two openings for receiving the coils. The metal is cut through from each opening, leaving a tongue between the same, which is inserted within the primary and secondary coils. The metal closes about these coils, thus surrounding them with thin laminæ of soft iron.

The invention further contemplates the employment of a continuous back piece for the laminated core. This back piece may consist of a tube or cylinder of soft iron fitting over the core, or when the converter is placed within an iron lamp-post the metal of the post may serve this purpose, if it is so desired.

In the accompanying drawings, Figure 1 is a transverse section, and Fig. 2 a side view, partly in section, of a converter embodying the features of the invention. Fig. 3 illustrates the application to a lamp-post.

Referring to the figures, A represents the core of a converter, and P and S respectively represent the primary and secondary coils. These coils are preferably separately wound and the core is applied afterward. The core consists of a series of disks of soft iron $a\ a$, each having openings $b'\ b^2$ for receiving the coils. The openings are cut open, as shown at $c'$ and $c^2$. The edges $e'$ and $e^2$ are bent back when the core is being built up and the central tongues $a'$ are inserted, alternate plates being preferably applied from opposite sides.

The plates $a\ a$ are preferably covered with some non-magnetic substance—such, for instance, as paper—upon one side. By placing the adjacent plates with their bare surfaces in contact with each other and then placing the covered surface of the succeeding plate against the corresponding surface of one of the first plates and continuing the same arrangement a very serviceable construction is secured.

When the core has been properly built up, the entire converter is placed in a solid tube F of soft iron properly fitted thereto. The entire converter may then be inserted within the post which is to contain it, and the primary coil has its circuit-connections completed with the conductors designed to supply the currents thereto. Conductors are led from the secondary coils in any desired manner. It may be desired to place one or more incandescent electric lamps upon the post and supply them with currents from the converter in a manner well understood.

The tube F may be dispensed with when desired, and in some instances the iron of the posts will serve in lieu thereof. It will be understood, however, that the converter is of use in other places than in the lamp-posts.

I claim as my invention—

1. The combination of primary and secondary conductors, a core of soft-iron plates circular in form, each plate having two openings for receiving the coils, the metal about each opening being cut apart, substantially as described, and a cylindrical inclosing case for the same.

2. An electric converter consisting of primary and secondary coils, a core of circular soft-iron plates or disks, and an inclosing-tube of soft iron.

3. An electric converter consisting of primary and secondary coils, a core of soft iron cylindrical in form and composed of thin plates, in combination with a lamp-post of iron having a cylindrical opening containing the same and in magnetic connection therewith.

4. An electric converter consisting of primary and secondary coils, and a core composed of soft-iron plates and a solid back piece common to all the plates.

5. An electric converter consisting of primary and secondary coils, and a core consisting of laminæ of soft iron magnetically separated through the greater portion of their surfaces and magnetically united at their edges.

6. An electric converter consisting of the combination of primary and secondary coils, and a core of soft-iron plates having an opening for receiving the coils and a cylindrical inclosing-case for the same.

In testimony whereof I have hereunto subscribed my name this 9th day of December, A. D. 1886.

GEO. WESTINGHOUSE, JR.

Witnesses:
WALTER D. UPTEGRAFF,
CHARLES A. TERRY.